US 6,731,085 B2

United States Patent
Sardar et al.

(10) Patent No.: US 6,731,085 B2
(45) Date of Patent: May 4, 2004

(54) METHOD AND APPARATUS FOR DETERMINING MOTOR FAULTS IN AN ELECTRIC ASSIST STEERING SYSTEM

(75) Inventors: Hemant M. Sardar, Farmington Hills, MI (US); Abbas A. Fardoun, Dearborn, MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 10/114,368

(22) Filed: Apr. 2, 2002

(65) Prior Publication Data

US 2003/0184246 A1 Oct. 2, 2003

(51) Int. Cl.[7] ............................................. H02K 17/32
(52) U.S. Cl. ....................... 318/434; 318/432; 318/433
(58) Field of Search ............................... 318/434, 432, 318/280, 561, 623, 629; 180/446

(56) References Cited

U.S. PATENT DOCUMENTS

| | | | |
|---|---|---|---|
| 4,843,291 A | * | 6/1989 | Predina ........................ 318/605 |
| 4,972,133 A | | 11/1990 | Hirota et al. |
| 4,984,647 A | | 1/1991 | Morishita et al. |
| 5,210,476 A | * | 5/1993 | Kazato ........................ 318/560 |
| 5,303,156 A | | 4/1994 | Matsuoka et al. |
| 5,637,974 A | * | 6/1997 | McCann ...................... 318/701 |
| 5,780,983 A | * | 7/1998 | Shinkawa et al. ........... 318/254 |
| 5,889,376 A | | 3/1999 | Takatsuka et al. |
| 6,014,598 A | * | 1/2000 | Duyar et al. .................. 701/29 |
| 6,107,767 A | | 8/2000 | Lu et al. |
| 6,194,849 B1 | | 2/2001 | Wilson-Jones et al. |
| 6,212,446 B1 | * | 4/2001 | Sato ............................ 700/293 |
| 6,236,197 B1 | * | 5/2001 | Holdsclaw et al. .......... 324/110 |
| 6,266,591 B1 | | 7/2001 | Wilson-Jones et al. |
| 6,271,637 B1 | | 8/2001 | Kushion |

* cited by examiner

Primary Examiner—Karen Masih
(74) Attorney, Agent, or Firm—Tarolli, Sundheim, Covell & Tummino L.L.P.

(57) ABSTRACT

A method and apparatus for determining a motor fault in an electric motor (50) determines a calculated rotor position ($\theta_{calc}$) of the electric motor. The calculated rotor position ($\theta_{calc}$) is compared to a measured rotor position ($\theta_{meas}$) of the electric motor (50) to determine a rotor position error ($\theta_{err}$). A motor fault in the electric motor (50) is determined when the rotor position error ($\theta_{err}$) exceeds a predetermined maximum rotor position error ($\theta_{err\_max}$).

23 Claims, 2 Drawing Sheets

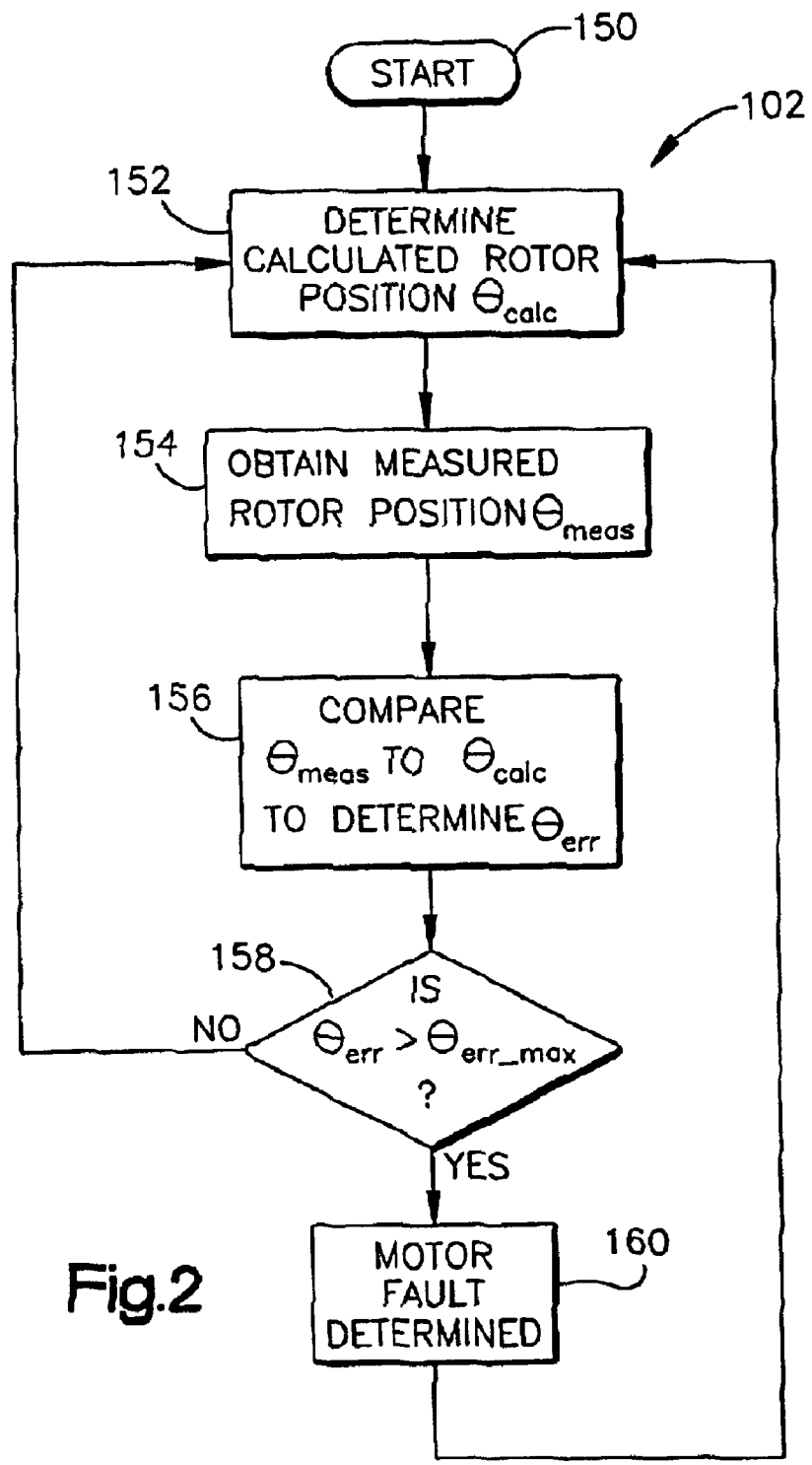

METHOD AND APPARATUS FOR DETERMINING MOTOR FAULTS IN AN ELECTRIC ASSIST STEERING SYSTEM

TECHNICAL FIELD

The present invention relates to a method and apparatus for determining motor faults in an electric motor. More particularly, in an exemplary embodiment, the present invention relates to a method and apparatus for determining motor faults in an electric assist motor of an electric assist steering system.

BACKGROUND OF THE INVENTION

Electric assist steering systems are known in the art. In electric assist steering systems, an electric assist motor, when energized, provides torque assist to aid the driver in turning steerable wheels of the vehicle. The electric assist motor is typically controlled in response to steering torque applied to the vehicle steering wheel and measured vehicle speed. A controller monitors applied steering torque and vehicle speed and controls a drive circuit to control electric current applied to the electric assist motor. A drive circuit in an electric assist steering system may include field effect transistors ("FETs") or other forms of solid state switching devices operatively coupled between the vehicle battery and the electric assist motor. Motor current may be controlled by pulse-width-modulation ("PWM") of the FETs or switches.

An electric assist steering system can use a permanent magnet alternating current (PMAC) motor. One particular type of PMAC motor is a three-phase PMAC motor. In a three-phase PMAC motor, the FETs are connected to provide three-phase voltage to the phases (A, B, C) of the motor. In operation of the three-phase PMAC motor, the A, B, and C phases of the motor are maintained 120 degrees (electrical) apart. For example, if phase A is at θ degrees, then phase B would be at (θ+120) degrees, and phase C would be at (θ−120) degrees.

In operation, the amount of torque produced by the PMAC motor is functionally related to the amplitude of the electric current in the phases of the motor. The frequency of the electric current in the phases of the PMAC motor is selected to create a magnetic field in the phase windings that rotates about the armature at a predetermined speed. The rotating magnetic field induces the rotor to rotate. The rotational speed of the rotor is thus determined by the frequency of the electric current in the phases of the PMAC motor.

In operation, the rotating magnetic field may be commanded to lead the rotor by some angle. The angle between the rotating magnetic field and the rotor is referred to as an advance angle. The advance angle of the electric current in the phases of the PMAC motor can be controlled by adjusting the phase angle of the current supplied to the windings. Typically, when controlling a PMAC motor, the advance angle is increased as the rotor speed increases depending on motor torque and power requirements.

During operation, a motor may experience what are commonly referred to as "motor faults". Motor faults may occur as a result of a variety of physical or structural failures of the motor. For example, in a PMAC motor, motor faults may occur when there is a short in a motor phase, when there is a phase-to-phase short in the motor phases, or when there is an open in a motor phase. Motor faults may cause the electric current realized in the motor phases to be different than the current commanded to the phases. As a result, the motor may not achieve the desired rotational speed or provide the desired torque.

SUMMARY OF THE INVENTION

In accordance with the present invention, a method for determining a motor fault in an electric motor includes the step of determining a calculated rotor position of the electric motor. Next, the calculated rotor position is compared to a measured rotor position of the electric motor to determine a rotor position error. Finally, a motor fault in the electric motor is determined when the rotor position error exceeds a predetermined maximum rotor position error.

Also, in accordance with the present invention, an apparatus for determining a motor fault in an electric motor determines a calculated rotor position of the electric motor. The apparatus then compares the calculated rotor position to a measured rotor position of the electric motor to determine a rotor position error. The apparatus determines a motor fault in the electric motor when the rotor position error exceeds a predetermined maximum rotor position error.

BRIEF DESCRIPTION OF THE DRAWINGS

The foregoing and other features and advantages of the present invention will become apparent to those skilled in the art to which the present invention relates upon reading the following description with reference to the accompanying drawings, wherein:

FIG. 2 is a functional block diagram of a motor fault determination circuit of the electric assist steering system of FIG. 1.

DESCRIPTION OF AN EXEMPLARY EMBODIMENT

Figure 1:
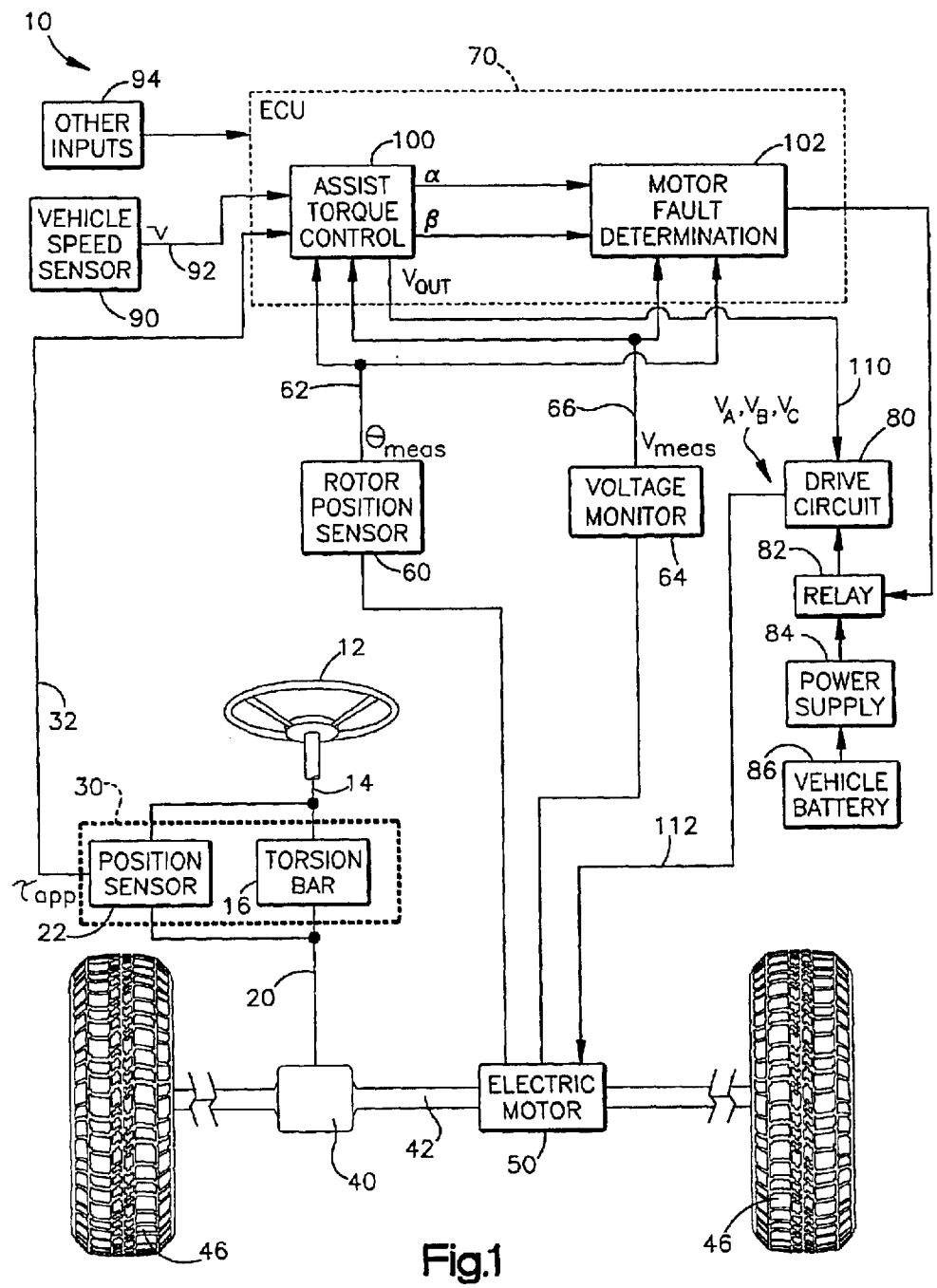
FIG. 1 is a schematic representation of an electric assist steering system in accordance with an exemplary embodiment of the present invention.

The present invention relates to an apparatus including an electric motor and means for controlling the electric motor. According to an exemplary embodiment of the present invention, the apparatus comprises an electric assist steering system 10. It will be appreciated, however, that the method and apparatus of the present invention may apply to electric motors in a variety of implementations, such as electric motors of machine tools, provided there is appropriate sensing and monitoring circuitry available.

Referring to FIG. 1, the electric assist steering system 10 includes a steering wheel 12 connected to an input shaft 14. The input shaft 14 is connected to an output shaft 20 by a torsion bar 16. A position sensor 22 is operatively connected to the input shaft 14 and to the output shaft 20. The position sensor 22 senses the relative rotational position between the input shaft 14 and the output shaft 20. Taking into account the torsion strength of the torsion bar 16, this sensed relative rotational position between the input shaft 14 and the output shaft 22 is indicative of the amount of steering torque applied to the steering wheel 12. Thus, the combination of the position sensor 22 and the torsion bar 16 function together as a torque sensor 30. It will be appreciated that the torque sensor 30 may have alternative configurations. The torque sensor 30 provides a sensed applied torque signal $\tau_{app}$, indicated at 32, having a value indicative of the amount of steering torque applied to the steering wheel 12.

The output shaft 20 is connected to a pinion gear (not shown) of a rack and pinion gear set 40. The rack and pinion gear set 40 functions to transform the rotational motion of the steering wheel 12 into linear motion of a steering rack 42. The steering rack 42 is steerably connected to steerable wheels 46 of the vehicle in a manner well known in the art. The linear movement of the steering rack 42 steers the wheels 46 of the vehicle.

In accordance with the described exemplary embodiment of the present invention, an electric assist motor 50 is operatively connected to the steering rack 42 through a ball nut assembly (not shown) in a manner known in the art. The present invention is also applicable to steering assist arrangements such as column drive systems, pinion drive systems, etc. When the electric assist motor 50 is energized, the rotor turns which, in turn, rotates the nut portion of the ball nut assembly. When the nut rotates, the balls transfer a linear force to the steering rack 42. The direction of movement of the steering rack 42 is dependent upon the direction of rotation of the electric assist motor 50.

The electric assist motor 50 of the exemplary embodiment is preferably a permanent magnet alternating current (PMAC) motor. It will be appreciated, however, that the present invention may be applicable to various other types of electric motors.

A PMAC motor operates in a known manner. Basically, the phases (A, B, C) in the stator (not shown) of the PMAC motor are energized with an amount of electric current in a sequence that is predetermined in order to achieve a desired motor torque in a desired rotational direction. The direction in which the rotor rotates is controlled by the sequence in which the phases are energized. The torque produced by the motor is determined by the amplitude of the current directed through the phases. The rotational speed of the motor is determined by the frequency of the current directed through the phases.

A rotor position sensor 60 is operatively connected to the electric assist motor 50 and senses the position of the motor rotor (not shown) relative to the motor stator. The position sensor 60 provides a rotor position signal $\theta$, indicated at 62, having a value indicative of the relative position between the rotor and the stator. The structure and operation of a rotor position sensor for use with a PMAC motor is known in the art and, therefore, is not described herein in detail. Any of several known position sensors can be used.

A voltage monitoring device 64 is operatively connected to the electric assist motor 50. The voltage monitoring device 64 measures phase voltages ($V_a$, $V_b$, $V_c$) of the electric assist motor 50. Line voltages ($V_{ab}$, $V_{bc}$, $V_{ca}$) of the electric assist motor 50 are calculated as a function of the measured phase voltages. The voltage monitoring device 64 provides a measured voltage signal $V_{meas}$, indicated at 66. The measured voltage signal $V_{meas}$ includes calculated line voltages ($V_{ab}$, $V_{bc}$, $V_{ca}$) of the electric assist motor. It will be appreciated, however, that the voltage monitor 64 could alternatively be operative to measure line voltages ($V_{ab}$, $V_{bc}$, $V_{ca}$) directly.

The electric assist steering system 10 includes an electronic control unit ("ECU") 70. The ECU 70 is preferably a microcomputer having memory means such as internal ROM and/or RAM. The ECU 70 is operatively connected to a drive circuit 80. The drive circuit 80 is connected to a power supply 84 via a relay 82. The power supply 84 conditions electrical power received from a vehicle battery 86 and supplies the conditioned electrical power to the drive circuit 80.

The ECU 70 is also operatively connected to the rotor position sensor 60 and the voltage monitor 64 and receives the rotor position $\theta$ and the measured voltage $V_{meas}$, respectively. A vehicle speed sensor 90 provides a vehicle speed signal v, indicated at 92, to the ECU 70. Other inputs, indicated generally at 94, may also be provided to the ECU 70 for control, safety, or system monitoring purposes.

In this description of exemplary embodiments, the use of the word "circuit" and "function" are used interchangeably to describe functions performed within devices such as the ECU 70, controllers, computers, etc. Alternatively, these functions could be performed using discrete circuitry. In the exemplary embodiment of the present invention, the ECU 70 includes an assist torque control circuit 100 and a motor fault determination circuit 102.

The assist torque control circuit 100 is operative to determine a required amount of steering assist torque as a function of the sensed applied steering torque $\tau_{app}$ and the vehicle speed v. The assist torque control circuit 100 determines a motor voltage command $V_{out}$, indicated at 110, as a function of the determined required steering assist torque and the sensed rotor position $\theta$. The motor voltage command $V_{out}$ is indicative of the voltage that must be applied to each phase (A, B, C) of the electric assist motor 50 so that the motor provides the required amount of steering assist torque.

The ECU 70 may incorporate any of a variety of methods for determining the required steering assist torque and the motor voltage command $V_{out}$. For example, the ECU 70 may determine these values using curve functions, equations, or by selecting the values from a look-up table. Since a look-up table would contain only discrete values, interpolation techniques may be used to determine the required steering assist torque and/or the motor voltage command $V_{out}$.

The ECU 70 provides the motor voltage command $V_{out}$ to the drive circuit 80. The drive circuit 80 includes field effect transistors ("FETs") or other suitable switching devices that are operative to provide voltage ($V_A$, $V_B$, $V_C$), indicated at 112, to the phases (A, B, C) of the electric assist motor 50. The amplitude and frequency of the voltage ($V_A$, $V_B$, $V_C$) for each phase is controlled by pulse-width-modulation ("PWM") of the FETs. The motor voltage command $V_{out}$ is formatted such that the FETs provide the voltage ($V_A$, $V_B$, $V_C$) at the required amplitude and frequency.

In performing calculations relating to the three phases (A, B, C) of the electric assist motor 50, it will be appreciated that it may be desirable to perform the calculations in a DQ reference frame. Calculations in the DQ frame utilize a two-dimensional vector representation of motor voltage which corresponds to three-phase (A, B, C) motor voltage values. Motor voltages can be converted back and forth between the DQ reference frame and the ABC frame using known mathematical transformation methods. Since these are known mathematical operations, transformation between the ABC frame and the DQ frame will not be discussed herein in detail.

It will also be appreciated that the rotor position of an electric motor may be calculated as a function of calculated line voltages ($V_{ab}$, $V_{bc}$, $V_{ca}$) of the motor. According to the present invention, a calculated rotor position of an electric motor is determined as a function of calculated line voltages ($V_{ab}$, $V_{bc}$, $V_{ca}$) of the motor. The calculated rotor position is compared to a measured rotor position. A motor fault condition is determined when the calculated rotor position differs from the measured rotor position to a predetermined degree.

In the exemplary embodiment, the motor fault detection circuit 102 of the ECU 70 determines motor faults in the electric assist motor 50. According to the present invention, calculations for determining the calculated rotor position may be performed in either the DQ reference frame or in the ABC reference frame.

Referring to FIG. 2, the motor fault determination circuit 102 performs an algorithm for determining whether a motor fault condition exists in the electric assist motor 50. The algorithm of the motor fault determination circuit begins at step or function 150. At step or function 152, a calculated rotor position $\theta_{calc}$ is determined as a function of the calculated line voltages ($V_{ab}$, $V_{bc}$, $V_{ca}$). Determination of the calculated rotor position $\theta_{calc}$ may be performed in either the ABC frame or the DQ frame, and will be discussed below in detail. At step or function 154, the measured rotor position $\theta_{meas}$ is obtained from the rotor position sensor 60 (FIG. 1).

At step or function 156 (FIG. 2), the calculated rotor position $\theta_{calc}$ is compared to the measured rotor position $\theta_{meas}$ to determine a rotor position error $\theta_{err}$. In the exemplary embodiment, the rotor position error $\theta_{err}$ is determined as the absolute difference between the calculated rotor position $\theta_{calc}$ and the measured rotor position $\theta_{meas}$ as follows:

$$\theta_{err}=|\theta_{calc}-\theta_{meas}| \quad (1)$$

At step or function 158, a determination is made as to whether the rotor position error $\theta_{err}$ is greater than a predetermined maximum rotor position error $\theta_{err\_max}$. If the rotor position error $\theta_{err}$ exceeds the maximum rotor position error $\theta_{err\_max}$, then a motor fault is determined at step or function 160 and the algorithm may begin another iteration at step or function 152. If the rotor position error $\theta_{err}$ does not exceed the maximum rotor position error $\theta_{err\_max}$, then the algorithm begins another iteration at step or function 152.

The algorithm performed by the motor fault determination circuit 102 may determine a motor fault condition when the rotor position error $\theta_{err}$ exceeds the maximum rotor position error $\theta_{err\_max}$ for at least one iteration of the algorithm. The motor fault determination circuit 102 may indicate a motor fault condition upon a single iteration or a predetermined number of iterations of the algorithm where the rotor position error $\theta_{err}$ exceeds the maximum rotor position error $\theta_{err\_max}$. The predetermined number of iterations may be a successive number of iterations or a cumulative number of iterations. Thus, steps 158 and 160 of the algorithm performed by the motor fault determination circuit 102 may be adapted to determine a motor fault condition when the rotor position error $\theta_{err}$ exceeds the maximum rotor position error $\theta_{err\_max}$ for this predetermined number of iterations.

Once a motor fault condition is determined by the motor fault determination circuit 102, the electric assist steering system 10 may be operative to provide a variety of responsive actions. For example, as illustrated in FIG. 1, the motor fault determination circuit 102 may be operatively connected to the relay 82. The motor fault determination circuit 102 thus may be operative to open the relay 82 in the event of a motor fault in order to disable the electric assist motor 50. Alternatively, the motor fault determination circuit 102 may be operative to provide an audible and/or visual indication or alarm of a motor fault condition in the electric assist motor 50.

Calculations in the ABC Frame

According to the exemplary embodiment of the present invention, the calculated rotor position $\theta_{calc}$ may be determined in the ABC frame at step 152 of the algorithm performed by the motor fault determination circuit 102. This may be particularly advantageous where the ABC phase voltages of the electric motor are controlled directly, i.e., in the ABC frame, by the assist torque control circuit 100. The phase voltages of the motor can be expressed as follows:

$$V_a = V\sin(\theta) \quad (2a)$$
$$V_b = V\sin(\theta-120) \quad (2b)$$
$$V_c = V\sin(\theta+120) \quad (2c)$$

where, V is the amplitude of the voltage applied to the electric motor.

The line voltages may be determined as a function of the phase voltages as follows:

$$V_{ab} = V_a - V_b = \frac{\sqrt{3}}{2}V(\sqrt{3}\sin\theta + \cos\theta) \quad (3a)$$
$$V_{bc} = V_b - V_c = -\sqrt{3}\cdot V\cos\theta \quad (3b)$$
$$V_{ca} = V_c - V_a = \frac{\sqrt{3}}{2}V(-\sqrt{3}\sin\theta + \cos\theta) \quad (3c)$$

Equations (3a) and (3c) can be expressed in terms of $V_{bc}$ as:

$$V_{ab} = -\frac{V_{bc}}{2} + \frac{3}{2}V\sin\theta \quad (4a)$$
$$V_{ca} = -\frac{V_{bc}}{2} - \frac{3}{2}V\sin\theta \quad (4b)$$

Combining Equations (4a) and (3b), a first calculated rotor position $\theta_{calc\_1}$ may be determined at step or function 152 using $V_{ab}$ and $V_{bc}$ as follows:

$$\theta_{calc\_1} = \arctan2\left(\frac{2}{3}\left(V_{ab} + \frac{V_{bc}}{2}\right), -\frac{V_{bc}}{\sqrt{3}}\right) \quad (5)$$

Similarly, combining Equations (4b) and (3b), a second calculated rotor position $\theta_{calc\_2}$ may be determined at step or function 152 using $V_{ca}$ and $V_{bc}$ as follows:

$$\theta_{calc\_2} = \arctan2\left(-\frac{2}{3}\left(V_{ca} + \frac{V_{bc}}{2}\right), -\frac{V_{bc}}{\sqrt{3}}\right) \quad (6)$$

As stated above, the line voltages ($V_{ab}$, $V_{bc}$, $V_{ca}$) are measured by the voltage monitor 64 and provided to the motor fault determination circuit 102 in the ECU 70. The first and second calculated rotor positions $\theta_{calc\_1}$ and $\theta_{calc\_2}$ are calculated via Equations (5) and (6) using the line voltages ($V_{ab}$, $V_{bc}$, $V_{ca}$) calculated via Equations (3a)–(3c).

The first and/or second calculated rotor positions $\theta_{calc\_1}$ and $\theta_{calc\_2}$ may be compared to the measured rotor position $\theta_{meas}$ at step of function 156. First and second rotor position errors $\theta_{err\_1}$ and $\theta_{err\_2}$ may be determined using the first and second calculated rotor positions $\theta_{calc\_1}$ and $\theta_{calc\_2}$, respectively, as follows:

$$\theta_{err\_1}=|\theta_{calc\_1}-\theta_{meas}| \quad (7a)$$
$$\theta_{err\_2}=|\theta_{calc\_2}-\theta_{meas}| \quad (7b)$$

At step or function 158, the first and/or second rotor position errors $\theta_{err\_1}$ and $\theta_{err\_2}$ are compared to the maximum rotor position error $\theta_{err\_max}$. At step or function 160, a fault condition is determined when either or both of the first and second calculated rotor position errors $\theta_{err\_1}$ and $\theta_{err\_2}$ exceed the maximum rotor position error $\theta_{err\_max}$.

It will be appreciated that the motor voltage command $V_{out}$ may be advanced by some advance angle α in order to increase motor power. For example, the motor voltage command $V_{out}$ could be advanced by a desired advance angle α. In this instance, it would be necessary to correct any calculated rotor position $θ_{calc}$ to compensate for the commanded advance. Thus, where the electric motor is advanced by a desired advance angle α, compensated first and second calculated rotor positions $θ_{calc\_1\_comp}$ and $θ_{calc\_2\_comp}$ may be determined as follows:

$$θ_{calc\_1\_comp} = θ_{calc\_1} + α + β \tag{8a}$$

$$θ_{calc\_2\_comp} = θ_{calc\_2} + α + β \tag{8b}$$

where β represents the motor impedance angle, which may be determined as follows:

$$\tan β = \frac{ωL}{R} \tag{9}$$

where R is the phase resistance, and L is the phase inductance, and ω is the motor electrical speed. In this instance, the advance angle α and the motor impedance angle β would be provided to the motor fault determination circuit 102 from the assist torque control circuit 100 as illustrated in FIG. 1.

The compensated first and second calculated rotor positions $θ_{calc\_1\_comp}$ and $θ_{calc\_2\_comp}$ would then be compared to the measured rotor position $θ_{meas}$ at step or function 156 to determine the first and second rotor position errors $θ_{err\_1}$ and $θ_{err\_2}$. The determination of a motor fault at steps or functions 158 and 160 would thus be performed using the compensated first and second calculated rotor positions $θ_{calc\_1\_comp}$ and $θ_{calc\_2\_comp}$.

Calculations in the DQ Frame

According to the exemplary embodiment of the present invention, the calculated rotor position $θ_{calc}$ may be determined in the DQ frame at step 152 of the algorithm performed by the motor fault determination circuit 102. This may be particularly advantageous where the ABC phase voltages of the electric motor are controlled indirectly, i.e., in the DQ frame, by the assist torque control circuit 100. The phase voltages of the motor can be expressed as follows:

$$V_a = V_d \sin(θ) + V_q \cos(θ) \tag{10a}$$

$$V_b = V_d \sin(θ-120) + V_q \cos(θ-120) \tag{10b}$$

$$V_c = V_d \sin(θ+120) + V_q \cos(θ+120) \tag{10c}$$

where $V_d$ and $V_q$ are the D-axis and Q-axis voltages, respectively. Equations (10a)–(10c) may be expressed as follows:

$$V_a = V \sin(θ+θ_v) \tag{11a}$$

$$V_b = V \sin(θ+θ_v-120) \tag{11b}$$

$$V_c = V \sin(θ+θ_v+120) \tag{11c}$$

where V is the amplitude of the voltage applied to the electric motor and $θ_v$ is the voltage angle. The voltage angle $θ_v$ may be expressed as follows:

$$\tan θ_v = \frac{V_d}{V_q} \tag{12}$$

The line voltages may be determined as a function of the voltage amplitude V and the voltage angle $θ_v$ as follows:

$$V_{ab} = \frac{\sqrt{3}}{2} V\left(\sqrt{3} \sin(θ+θ_v) + \cos(θ+θ_v)\right) \tag{13a}$$

$$V_{bc} = -\sqrt{3} \cdot V \cos(θ+θ_v) \tag{13b}$$

$$V_{ca} = \frac{\sqrt{3}}{2} V\left(-\sqrt{3} \sin(θ+θ_v) + \cos(θ+θ_v)\right) \tag{13c}$$

Equations (13a) and 13C) can be expressed in terms of $V_{bc}$ as:

$$V_{ab} = -\frac{V_{bc}}{2} + \frac{3}{2} V \sin(θ+θ_v) \tag{14a}$$

$$V_{ca} = -\frac{V_{bc}}{2} - \frac{3}{2} V \sin(θ+θ_v) \tag{14b}$$

The voltage angle may be obtained for use in Equations (14a) and (14b) as follows:

$$\tan θ_v = \frac{RI_q\left(\tan α + \frac{ωL}{R}\right)}{k_e ω_m + RI_q\left(1 - \frac{ωL}{R}\tan α\right)} \tag{15}$$

where R is the phase resistance, L is the phase inductance, $k_e$ is the per-phase back-emf, $I_q$ is the Q-axis current, and α is the motor advance angle. These values may be stored and/or calculated in the ECU 70.

It will be appreciated that it may be desirable to perform calculations in the assist torque control circuit 100 at a higher speed than the calculations the motor fault determination circuit 102. In this instance, the Q-axis current may be approximated by a Q-axis current command as:

$$I_q ≈ I_{qcmd} ≈ \frac{T_{cmd}}{k_t} \tag{16}$$

where, $T_{cmd}$ is the motor torque command and $k_t$ is the motor torque constant. Thus, Equation (15) may also be expressed as follows:

$$\tan θ_v = \frac{\sin(α+β)}{\frac{k_e ω_m}{I\sqrt{R^2+ω^2 L^2}} + \cos(α+β)} \tag{17}$$

where, I is the phase current and β is the motor impedance angle. It will be appreciated that Equations (15–17) account for the effects of motor advance, i.e., the advance angle α and the motor impedance angle β, in determining the voltage angle $θ_v$.

Combining Equations (14a) and (13b), a first calculated rotor position $θ_{calc\_1}$ may be determined at step or function 152 using $V_{ab}$ and $V_{bc}$ as follows:

$$θ_{calc\_1} + θ_v = \arctan 2\left(\frac{2}{3}\left(V_{ab} + \frac{V_{bc}}{2}\right), -\frac{V_{bc}}{\sqrt{3}}\right) \tag{18}$$

Similarly, combining Equations (14b) and (13b), a second calculated rotor position $θ_{calc\_2}$ may be determined at step or function 152 using $V_{ca}$ and $V_{bc}$ as follows:

$$\theta_{calc\_2} + \theta_v = \arctan2\left(-\frac{2}{3}\left(V_{ca} + \frac{V_{bc}}{2}\right), -\frac{V_{bc}}{\sqrt{3}}\right) \quad (19)$$

In Equations (18) and (19), the voltage angle $\theta_v$ may be determined using either Equation (15) or Equation (17).

As stated above, the line voltages ($V_{ab}$, $V_{bc}$, $V_{ca}$) are calculated and provided to the motor fault determination circuit 102 in the ECU 70. The first and second calculated rotor positions $\theta_{calc\_1}$ and $\theta_{calc\_2}$ are calculated via Equations (18) and (19) using the calculated line voltages ($V_{ab}$, $V_{bc}$, $V_{ca}$) provided by the voltage monitor 64.

The first and/or second calculated rotor positions $\theta_{calc\_1}$ and $\theta_{calc\_2}$ may be compared to the measured rotor position $\theta_{meas}$ at step of function 154. First and second rotor position errors $\theta_{err\_1}$ and $\theta_{err\_2}$ may be determined using the first and second calculated rotor positions $\theta_{calc\_1}$ and $\theta_{calc\_2}$, respectively, as follows:

$$\theta_{err\_1} = |\theta_{calc\_1} - \theta_{meas}| \quad (20a)$$

$$\theta_{err\_2} = |\theta_{calc\_2} - \theta_{meas}| \quad (20b)$$

At step or function 158, the first and/or second rotor position errors $\theta_{err\_1}$ and $\theta_{err\_2}$ are compared to the the maximum rotor position error $\theta_{err\_max}$. At step or function 160, a fault condition is determined when either or both of the first and second calculated rotor position errors $\theta_{err\_1}$ and $\theta_{err\_2}$ exceed the maximum rotor position error $\theta_{err\_max}$.

From the above description of the invention, those skilled in the art will perceive improvements, changes and modifications. Such improvements, changes and modifications within the skill of the art are intended to be covered by the appended claims. Image Page 1

Having described the invention, the following is claimed:

1. A method for determining a motor fault in an electric motor, said method comprising the steps of:
   determining a calculated rotor position of the electric motor;
   comparing said calculated rotor position to a measured rotor position of the electric motor to determine a rotor position error as the absolute difference between said calculated rotor position and said measured rotor position; and
   determining a motor fault in the electric motor when said rotor position error exceeds a predetermined maximum rotor position error.

2. The method recited in claim 1, wherein said step of determining a calculated rotor position comprises the steps of determining line voltages of the electric motor and calculating said calculated rotor position as a function of said line voltages.

3. The method as recited in claim 2, wherein said step of determining line voltages comprises the steps of measuring phase voltages of the electric motor and calculating said line voltages as a function of said phase voltages.

4. The method as recited in claim 1, further comprising the step of disabling the electric motor when a motor fault is determined.

5. The method as recited in claim 1, further comprising the step of providing at least one of a visual and audible indication when a motor fault is determined.

6. A method for determining a motor fault in a three-phase electric motor, said method comprising the steps of:
   determining a calculated rotor position of the electric motor as a function of two line voltages of the three-phase electric motor;
   comparing said calculated rotor position to a measured rotor position of the electric motor to determine a rotor position error; and
   determining a motor fault in the electric motor when said rotor position error exceeds a predetermined maximum rotor position error.

7. The method as recited in claim 6, wherein said step of determining a calculated rotor position further comprises the steps of determining a first calculated rotor position as a function of first and second line voltages of said three-phase electric motor, and determining a second calculated rotor position as a function of said second line voltage and a third line voltage of said three-phase electric motor.

8. The method as recited in claim 7, wherein said step of comparing comprises comparing said first calculated rotor position to said measured rotor position to determine a first calculated rotor position error.

9. The method as recited in claim 8, wherein said step of comparing further comprises comparing said second calculated rotor position to said measured rotor position to determine a second calculated rotor position error.

10. The method as recited in claim 9, wherein said step of determining a motor fault comprises determining when at least one of said first and second calculated rotor position errors exceeds said predetermined maximum rotor position error.

11. The method as recited in claim 9, wherein said step of determining a motor fault comprises determining when at least one of said first and second calculated rotor position errors exceeds said predetermined maximum rotor position error a predetermined number of times.

12. Apparatus for determining a motor fault in an electric motor, said apparatus comprising:
   means for determining a calculated rotor position of the electric motor;
   means for comparing said calculated rotor position to a measured rotor position of the electric motor to determine a rotor position error as the absolute difference between said calculated rotor position and said measured rotor position; and
   means for determining a motor fault in the electric motor when said rotor position error exceeds a predetermined maximum rotor position error.

13. Apparatus as recited in claim 12, wherein said means for determining a calculated rotor position comprises means for determining line voltages of the electric motor and means for calculating said calculated rotor position as a function of said line voltages.

14. Apparatus as recited in claim 13, wherein said means for determining line voltages comprises means for measuring phase voltages of the electric motor and means for calculating said line voltages as a function of said phase voltages.

15. Apparatus as recited in claim 12, further comprising means for disabling the electric motor when a motor fault is determined.

16. Apparatus as recited in claim 12, further comprising means for providing at least one of a visual and audible indication when a motor fault is determined.

17. An electric assist steering system comprising:
   a vehicle steering gear operable to effectuate movement of steerable vehicle wheels upon application of an applied steering torque;
   an electric assist motor for providing steering assist torque for assisting said applied steering torque;
   means for sensing said applied steering torque and providing a measured torque indicative of said sensed applied steering torque;

means for controlling said electric assist motor, said means for controlling being operatively connected to said means for sensing to receive said measured torque signal, said means for controlling being operative to determine a motor voltage command;

means for providing electric current to said electric assist motor in accordance with said motor voltage command; and means for determining a motor fault in the electric assist motor when a calculated rotor position differs from a measured rotor position to a predetermined degree.

18. Apparatus for determining a motor fault in a three-phase electric motor, said apparatus comprising:

means for determining a calculated rotor position of the electric motor as a function of two line voltages of the three-phase electric motor;

means for comparing said calculated rotor position to a measured rotor position of the electric motor to determine a rotor position error; and means for determining a motor fault in the electric motor when said rotor position error exceeds a predetermined maximum rotor position error.

19. Apparatus as recited in claim 18, said means for determining a calculated rotor position is operative to determine a first calculated rotor position as a function of first and second line voltages of said three-phase electric motor, and is operative to determine a second calculated rotor position as a function of said second line voltage and a third line voltage of said three-phase electric motor.

20. Apparatus as recited in claim 19, wherein means for comparing is operative to compare said first calculated rotor position to said measured rotor position to determine a first calculated rotor position error.

21. Apparatus as recited in claim 20, wherein means for comparing is operative to compare said second calculated rotor position to said measured rotor position to determine a second calculated rotor position error.

22. Apparatus as recited in claim 21, wherein said means for determining a motor fault is operative to determine when at least one of said first and second calculated rotor position errors exceeds said predetermined maximum rotor position error.

23. Apparatus as recited in claim 21, wherein said means for determining a motor fault is operative to determine when at least one of said first and second calculated rotor position errors exceeds said predetermined maximum rotor position error a predetermined number of times.

* * * * *